(12) United States Patent
Brown et al.

(10) Patent No.: US 6,356,908 B1
(45) Date of Patent: Mar. 12, 2002

(54) AUTOMATIC WEB PAGE THUMBNAIL GENERATION

(75) Inventors: Michael Wayne Brown, Georgetown; Kelvin Roderick Lawrence; Michael A. Paolini, both of Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,694

(22) Filed: Jul. 30, 1999

(51) Int. Cl.$^7$ .............................................. G06F 17/30

(52) U.S. Cl. ........................................ 707/10; 707/513

(58) Field of Search ......................... 707/10, 500, 530, 707/3, 513, 102; 709/219; 382/305

(56) References Cited

U.S. PATENT DOCUMENTS

| | | | |
|---|---|---|---|
| 5,099,426 A | 3/1992 | Carlgren et al. | 364/419 |
| 5,227,771 A | 7/1993 | Kerr et al. | 340/731 |
| 5,365,360 A | 11/1994 | Torres | 395/159 |
| 5,416,901 A | 5/1995 | Torres | 395/159 |
| 5,491,783 A | 2/1996 | Douglas et al. | 395/159 |
| 5,550,969 A | 8/1996 | Torres et al. | 395/159 |
| 5,615,320 A | 3/1997 | Lavendel | 395/131 |
| 5,623,652 A | 4/1997 | Vora et al. | 395/610 |
| 5,699,458 A | 12/1997 | Sprague | 382/250 |
| 5,704,060 A | 12/1997 | Del Monte | 395/600 |
| 5,715,443 A | 2/1998 | Yanagihara et al. | 395/603 |
| 5,737,599 A | 4/1998 | Rowe et al. | 395/615 |
| 5,737,733 A | 4/1998 | Eller | 727/3 |

(List continued on next page.)

FOREIGN PATENT DOCUMENTS

| | | | | |
|---|---|---|---|---|
| EP | 0 851 367 A1 | 12/1996 | | G06F/17/30 |
| EP | 1007461 | 11/1997 | | G06F/17/30 |
| EP | 0 810 520 A1 | 12/1997 | | G06F/9/44 |
| JP | 10149372 | 6/1998 | | G06F/17/30 |
| WO | WO 97/44726 | 11/1997 | | G06F/3/00 |
| WO | WO 98/48546 | 10/1998 | | H04L/29/06 |
| WO | WO 98/53411 | 11/1998 | | G06F/17/30 |

OTHER PUBLICATIONS

Hirsch et al; Creating Custom Graphical Web Views Based On User Browsing History; Feb. 16, 1999; pp 1–14.
Dorsey et al; Pretty as the Picture; May 1, 1998; pp 1–9.
International Business Machines Corporation; Efficient 3D Method for Displaying Browser Uniform Resource Locator Bookmarks; Jan. 1998; Technical Disclosure Bulletin pp. 1–3.
El Saddik, et al.; Exploiting User Behaviour In Prefetching WWW Documents; 1998; xv+326 pp.
IBM Technical Disclosure Bulletin; Method for Providing A Summary for Web Page Links; vol. 41, No. 01, Jan. 1998 pp 185–186.
IBM Technical Disclosure Bulletin; Proactive Universal Resource Locators Lookup In Internet Web Browsers; vol. 40, No. 09, Sep. 1997 p. 113.
Thumbnail Views; www.softquad.co.uk/products/hotmetal/reviewersguide/09.html.
Web Thumbnailer, The Easiest Way to Generate Thumbnail Web Pages Of Your Favorite Images; Dragon Works Software; www.majordomo.net/dragonworks/.
Special Edition Using Windows 98, Managing Files Using Web View, pp. 1–9, www.itlibrary.com/library/0789714884/ch08/ch098.html.

*Primary Examiner*—Sanjiv Shah
(74) *Attorney, Agent, or Firm*—Duke W. Yee; Jeffrey S. LaBaw; Stephen R. Loe

(57) ABSTRACT

A method for presenting content from the page in a distributed database. In a preferred embodiment, a page of data from the database is presented to a user. The page has a plurality of links to linked pages in the database. A set of thumbnail images of the linked pages in the database is presented to the user near the links to the linked pages.

30 Claims, 11 Drawing Sheets

U.S. PATENT DOCUMENTS

| | | |
|---|---|---|
| 5,742,816 A | 4/1998 | Barr et al. .................. 395/615 |
| 5,745,889 A | 4/1998 | Burrows ........................ 707/2 |
| 5,754,776 A | 5/1998 | Hales, II et al. ........ 395/200.34 |
| 5,787,435 A | 7/1998 | Burrows .................... 707/102 |
| 5,793,966 A | 8/1998 | Amstein et al. ....... 395/200.33 |
| 5,797,008 A | 8/1998 | Burrows .................... 395/612 |
| 5,809,502 A | 9/1998 | Burrows ........................ 707/7 |
| 5,812,134 A | 9/1998 | Pooser et al. ............... 345/356 |
| 5,812,999 A | 9/1998 | Tateno ........................... 707/3 |
| 5,819,032 A | 10/1998 | de Vries et al. ......... 395/200.8 |
| 5,826,261 A | 10/1998 | Spencer ......................... 707/5 |
| 5,854,597 A | 12/1998 | Murashita et al. ............ 341/51 |
| 5,860,071 A | 1/1999 | Ball et al. .................... 707/100 |
| 5,864,863 A | 1/1999 | Burrows ..................... 707/103 |
| 5,870,549 A | 2/1999 | Bobo, II ..................... 395/200 |
| 5,873,076 A | 2/1999 | Barr et al. ...................... 707/3 |
| 5,903,892 A * | 5/1999 | Hoffert et al. ................. 707/10 |
| 6,058,417 A * | 5/2000 | Hess et al. ................... 709/219 |
| 6,169,998 B1 * | 1/2001 | Iwasaki et al. ............. 707/530 |
| 6,181,838 B1 * | 1/2001 | Knowlton ................... 382/305 |
| 6,182,090 B1 * | 1/2001 | Peairs ........................ 707/500 |

* cited by examiner

AltaVista: Simple Query Mike Paolini - Microsoft Internet Explorer

File  Edit  View  Go  Favorites  Help    Address  http://www.altavista.com/cgi-bin/query?pg=q&kl=XX&q=Mike+Paolini Links  Best of the Web  Channel Guide  Customize Links  Internet Explorer News  Internet Start  Microsoft  RealPlay Books about Mike Paolini...
Amazon.com Bestsellers
AltaVista Shopping
Visit our Online
Shopping Guide
Featured links
AltaVista Entertainment Site!

1. No Title
DBATF Minutes December 5, 1995. Attendees: Keith Benton.
Sharon Brengel. Bob Cademy. Bob Clay. Chrys Dutton. Sharon
Edwards. Mike Floyd. Ellene Gibbs....
URL: datainfra.sdsu.edu/dics1/dbatf/meetings/mn951205.htm
Last modified 5-May-97 – page size 4K – in English [ Translate ]

2. Artisti: Germano Paolini
Ritratto di una città. di Mario De Micheli. Praga: chi vi è stato ne conserva un ricordo profondo,
quasi una sorta di permanente nostalgia. Senza dubbio...
URL: www.comune.siena.it/cultura/patrizi/presegep.htm
Last modified 9-Aug-98 – page size 5K – in Italian [ Translate ]

3. Giulio Paolini
Giulio Paolini. Eco e Narciso, matita e pastello su tela, 1978, cm 180x120 (x2)
URL: eurialo.cib.na.cnr.it/remuna/trisor/pao.html
Last modified 17-Apr-98 – page size 275 bytes – in Italian [ Translate ]

4. Lisa by Gary Paolini
Lisa. by Gary Paolini. When I was twenty-two I became involved with a woman named Lisa, who
was twenty- seven and had a four-year-old son named Mitchell...
URL: think.ucdavis.edu/jul-aug_95/paolini.html
Last modified 9-Aug-98 – page size 4K – in English [ Translate ]

Internet zone

AltaVista: Simple Query Mike Paolini - Microsoft Internet Explorer

File  Edit  View  Go  Favorites  Help    Address  http://www.altavista.com/cgi-bin/query?pg=q&kl=XX&q=Mike+Paolini Links  Best of the Web  Channel Guide  Customize Links  Internet Explorer News  Internet Start  Microsoft  RealPlay Books about Mike Paolini...
Amazon.com Bestsellers
AltaVista Shopping
Visit our Online
Shopping Guide
Featured links
AltaVista Entertainment Site!

1. No Title
DBATF Minutes December 5, 1995. Attendees: Keith Benton.
Sharon Brengel. Bob Cademy. Bob Clay. Chrys Dutton. Sharon
Edwards. Mike Floyd. Ellene Gibbs....
URL: datainfra.sdsu.edu/dics1/dbatf/meetings/mn951205.htm
Last modified 5-May-97 - page size 4K - in English [ Translate ]

2. Artisti: Germano Paolini
Ritratto di una citt    Micheli. Praga: chi vi è stato ne conserva un ricordo profondo,
quasi una sorta di p     ostalgia. Senza dubbio....
URL: www.comune.sie    patrizi/presegep.htm
Last modified 9-Aug     size 5K - in Italian [ Translate ]

3. Giulio Paolini
Giulio Paolini. Eco e Narciso, matita e pastello su tela, 1978, cm 180x120 (x2)
URL: eurialo.cib.na.cnr.it/remuna/trisor/pao.html
Last modified 17-Apr-98 - page size 275 bytes - in Italian [ Translate ]

4. Lisa by Gary Paolini
Lisa. by Gary Paolini. When I was twenty-two I became involved with a woman named Lisa, who
was twenty- seven and had a four-year-old son named Mitchell...
URL: think.ucdavis.edu/jul-aug_95/paolini.html
Last modified 9-Aug-98 - page size 4K - in English [ Translate ]

Internet zone

*FIG. 12*

AUTOMATIC WEB PAGE THUMBNAIL GENERATION

The present application is related to copending U.S. patent application Ser. No. 09/364,696 entitled "Navigation Assistant—Method and Apparatus for Providing User Configured Complementary Information for Data Browsing in a Viewer Context"), U.S. patent application Ser. No. 09/364,740 entitled "Web Page Thumbnails and User Configured Complementary Information Provided from a Server"), U.S. patent application Ser. No. 09/364,693 entitled "Method and System for Providing a Graphical Tree View of Web Pages"), and U.S. patent application Ser. No. 09/364,695 entitled "Web Page Thumbnails with Active Hot Links") filed even date herewith. The above mentioned patent applications are assigned to the assignee of and share the same inventors as the present invention. The content of the cross referenced copending applications are hereby incorporated herein by reference.

BACKGROUND OF THE INVENTION

1. Technical Field

The invention relates generally to the field of computer software and, more specifically, to Internet related computer software.

2. Description of Related Art

The "Internet" is a globally accessible network of computers that collectively provide a large amount and variety of information to users. From services of the Internet such as the World Wide Web (or simply, the "web"), users may retrieve or "download" data from Internet network sites and display the data that includes information presented as text in various fonts, graphics, images, and the like having an appearance intended by the publisher. As the information revolution has exploded, more and more information is available through the internet. However, finding particular pieces of information out of the millions of "web sites" available can be daunting.

One way of sorting through this mass of information to find what is of interest for a particular user is through the use of "search engines". Search engines are software written to search, among the millions of web sites, for certain key words or criteria entered by a user, and to return to the user a list of links (references to other HTML pages) to the sites that the search engine determines to be relevant to the criteria entered by the user. Different search engines use different methods of determining the relevance of web sites, but most use some sort of quantitative method that determines the relevance of a site based on how many times the key words appear in that particular site.

Search engines typically return a list of links to relevant sites with perhaps a short verbal description of the site. A typical example of a screen image returned by a search engine is illustrated in FIG. 1. Notice that each link is represented only with a textual name followed by a short textual description of the linked page. Often times, this does not provide sufficient information to enable one to make an intelligent decision as to whether to follow the link. Thus, the user is left with the time consuming task of sorting through the links returned by the search engine to determine which of these is the best match. Furthermore, there is no way for a user to determine based on the search engine results whether the site or web page is still active or if it has been removed.

Similar problems exist with regard to following links from one web page to another (sometimes referred to as "web surfing"). Often times, users find the information they are looking for by following links on web pages, but the same problem exists here as with search engines. Many times, the links will have only short descriptions about the contents of the web page to which they link—usually, just a highlighted word. Furthermore, a web page will often contain a dead link and there is no way the user can determine this except by trial and error. Therefore, it would be beneficial for Internet users to have a tool to enable them to make more informed decisions about which links to follow.

SUMMARY OF THE INVENTION

The present invention provides a method for presenting content from the page in a distributed database. In a preferred embodiments a page of data from the database is presented to a user. The page has a plurality of links to linked pages in the database. A set of thumbnail images of the linked pages in the database is presented to the user near the links to the linked pages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 shows a typical screen image result for current Internet search engines;

FIG. 10 shows a screen image for search results from a search engine with modified thumbnails;

FIG. 12 shows a screen image of search results from a search engine illustrating pup-up thumbnails;

DETAILED DESCRIPTION OF THE PREFERRED EMBODIMENT

Figure 2:
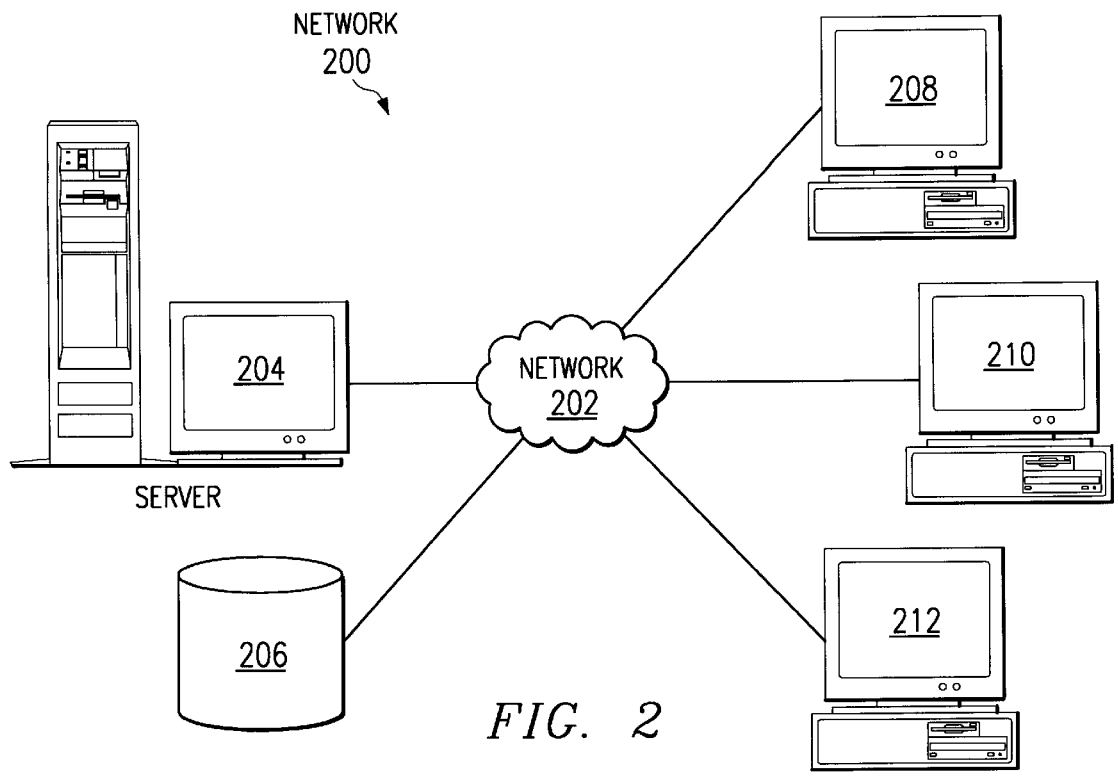
FIG. 2 shows a pictorial representation of a distributed data processing system in which the present invention may be implemented.

With reference now to the figures, and in particular with reference to FIG. 2, a pictorial representation of a distributed data processing system is depicted in which the present invention may be implemented.

Distributed data processing system 200 is a network of computers in which the present invention may be implemented. Distributed data processing system 200 contains network 202, which is the medium used to provide communications links between various devices and computers connected within distributed data processing system 200. Network 202 may include permanent connections, such as wire or fiber optic cables, or temporary connections made through telephone connections. In the depicted example, server 204 is connected to network 202, along with storage unit 206. In addition, clients 208, 210 and 212 are also connected to network 202. These clients, 208, 210 and 212, may be, for example, personal computers or network computers. For purposes of this application, a network computer is any computer coupled to a network which receives a program or other application from another computer coupled to the network. In the depicted example, server 204 provides data, such as boot files, operating system images and applications, to clients 208–212. Clients 208, 210 and 212 are clients to server 204. Distributed data processing system 200 may include additional servers, clients, and other devices not shown.

In the depicted example, distributed data processing system 200 is the Internet, with network 202 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 200 also may be implemented as a number of different types of networks such as, for example, an Intranet, the World Wide Web ("WWW"), or a local area network.

FIG. 2 is intended as an example and not as an architectural limitation for the processes of the present invention.

Figure 3:
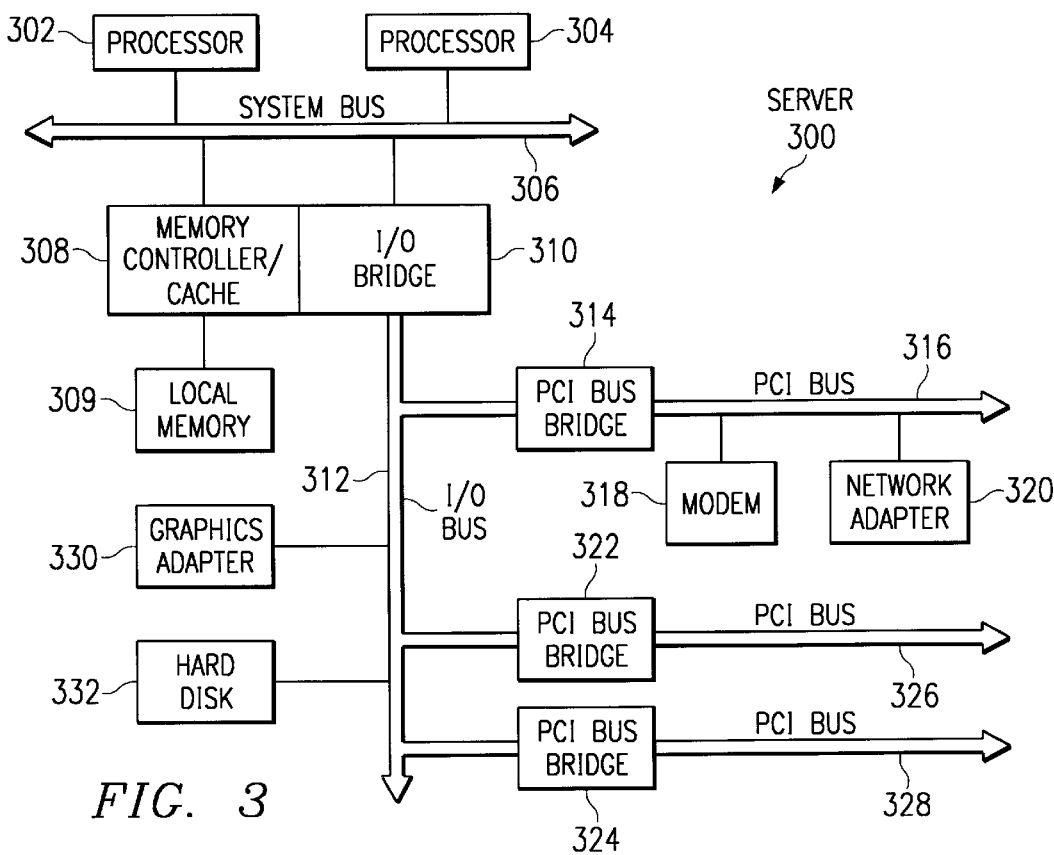
FIG. 3 shows a block diagram of a data processing system which may be implemented as a server in accordance with the present invention.

Referring to FIG. 3, a block diagram of a data processing system which may be implemented as a server, such as server 204 in FIG. 2, is depicted in accordance with the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems 318–320 may be connected to PCI bus 316. Typical PCI bus implementations will support four PCI expansion slots or add-in connectors. Communications links to network computers 208–212 in FIG. 2 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RS/6000 workstation, a product of International Business Machines Corporation in Armonk, N.Y., running the Advanced Interactive Executive (AIX) operating system.

Figure 4:
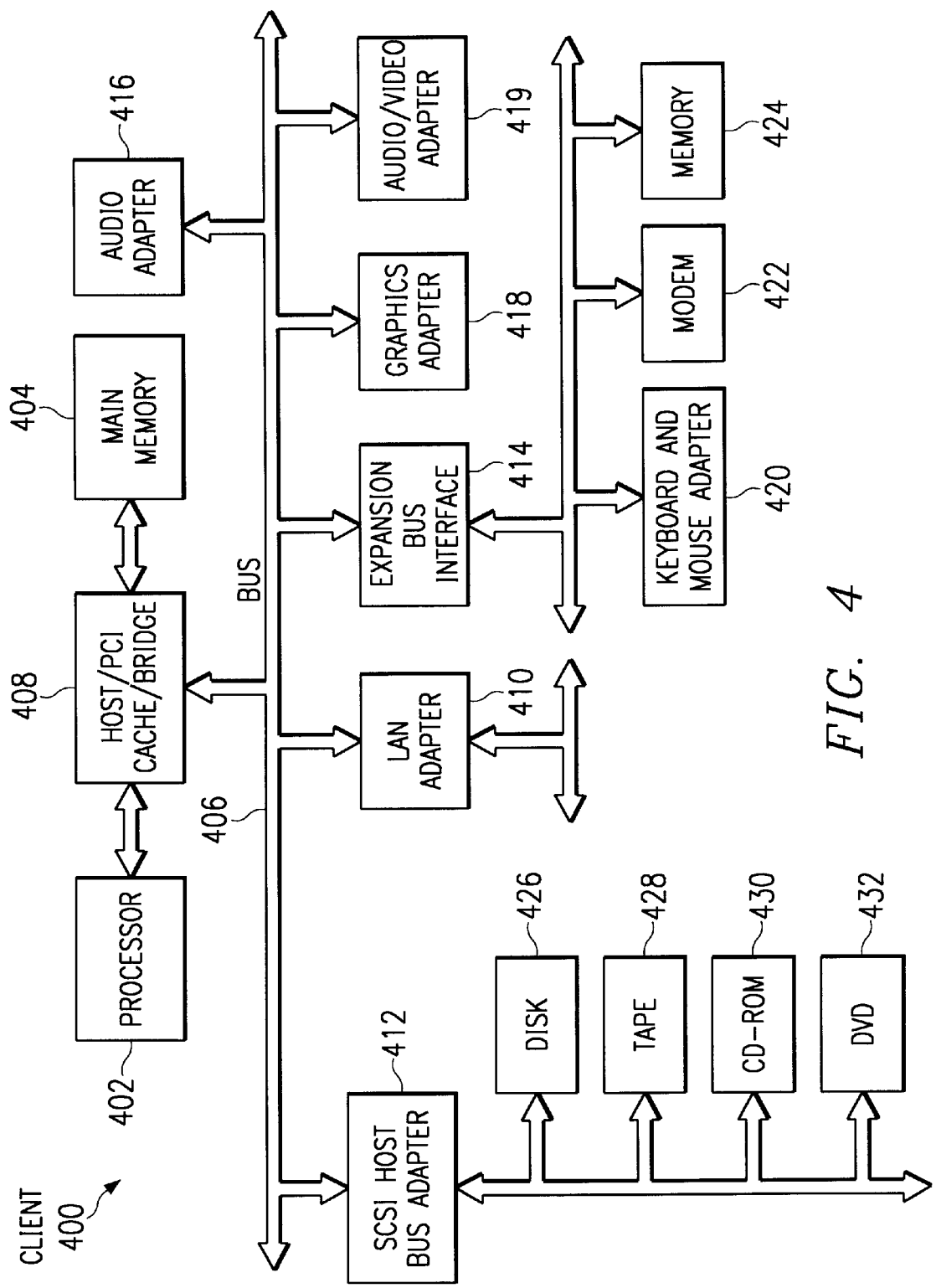
FIG. 4 shows a block diagram of a data processing system in which the present invention may be implemented.

With reference now to FIG. 4, a block diagram of a data processing system in which the present invention may be implemented is illustrated. Data processing system 400 is an example of a client computer. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420, modem 422, and additional memory 424. In the depicted example, SCSI host bus adapter 412 provides a connection for hard disk drive 426, tape drive 428, CD-ROM drive 430, and digital video disc read only memory drive (DVD-ROM) 432. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 400. Instructions for the operating system, the object-oriented operating system, and applications or programs are located on a storage device, such as hard disk drive 426, and may be loaded into main memory 404 for execution by processor 402.

Those of ordinary skill in the art will appreciate that the hardware in FIG. 4 may vary depending on the implementation. For example, other peripheral devices, such as optical disk drives and the like, may be used in addition to or in place of the hardware depicted in FIG. 4. The depicted example is not meant to imply architectural limitations with respect to the present invention. For example, the processes of the present invention may be applied to multiprocessor data processing systems.

Figure 5:
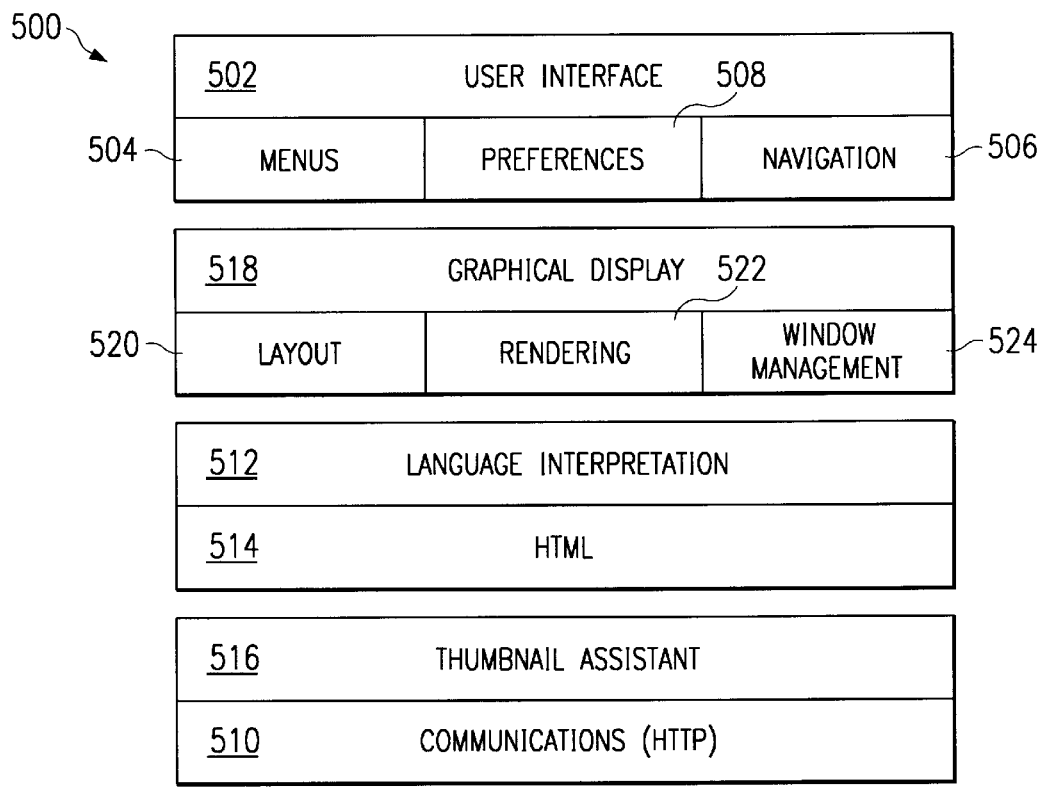
FIG. 5 depicts a block diagram of a browser program in accordance with a preferred embodiment of the present invention.

Turning next to FIG. 5, a block diagram of a browser program is depicted in accordance with a preferred embodiment of the present invention. Browser 500 includes a user interface 502, which is a graphical user interface (GUI) that allows the user to interface or communicate with browser 500. This interface provides for selection of various functions through menus 504 and allows for navigation through navigation 506. For example, menu 504 may allow a user to perform various functions, such as saving a file, opening a new window, displaying a history, and entering a URL. Navigation 506 allows for a user to navigate various pages and to select web sites for viewing. For example, navigation 506 may allow a user to see a previous page or a subsequent page relative to the present page. Preferences may be set through preferences 508.

Communications block 510 is the mechanism with which browser 500 receives documents and other resources from a network such as the Internet. Further, communications 510 is used to send or upload documents and resources onto a network. Thumbnail Assistant 516 intercepts and parses documents after communications 510 receives documents, but prior to processing by language interpretation 512. After parsing documents, thumbnail assistant 516 generates thumbnail images of linked pages to a loaded web page and displays these thumbnails to a user on a client machine. In the depicted example, communication 510 uses HTTP. Documents that are received by browser 500 are processed by language interpretation 512, which includes an HTML unit 514. Language interpretation 512 will process a document for presentation on graphical display 518. In particular, HTML statements are processed by HTML unit 514 for presentation. Alternatively, and preferably, parsing can be performed once and the result then passed to the thumbnail assistant 516 to generate the thumbnails and then the thumbnails are passed to the graphical display.

Graphical display 518 includes layout unit 520, rendering unit 522, and window management 524. These units are involved in presenting web pages to a user based on results from language interpretation 512.

In the present example, thumbnail assistant 516 is depicted as a "plug-in" module to browser 500. Plug-in refers to a file containing data or application software used to alter, enhance, or extend the operation of a parent application program. For example, the Netscape Navigator World-Wide Web browser supports plug-ins. However, although the "plug-in" module is the preferred embodiment, thumbnail assistant 516 could be incorporated into browser 500 as a direct modification of code.

Furthermore, thumbnail assistant 516 could be utilized on a proxy server, wherein thumbnail assistant 516 pre-generates web pages on a web server prior to receipt by browser 500. In this instance, which would be preferred for legacy browsers, the server would modify the stream sent to the user and place references to the thumbnails in that stream. Another method would be to send the information in a separate stream, provided the user is prepared to expect a separate stream. The user would then overlay this additional information and place it somewhere else, such as in a separate window, or simply ignore it, depending on the user's preference.

Browser 500 is presented as an example of a browser program in which the present invention may be embodied.

Browser 500 is not meant to imply architectural limitations to the present invention. Presently available browsers may include additional functions not shown or may omit functions shown in browser 500.

Figure 6:
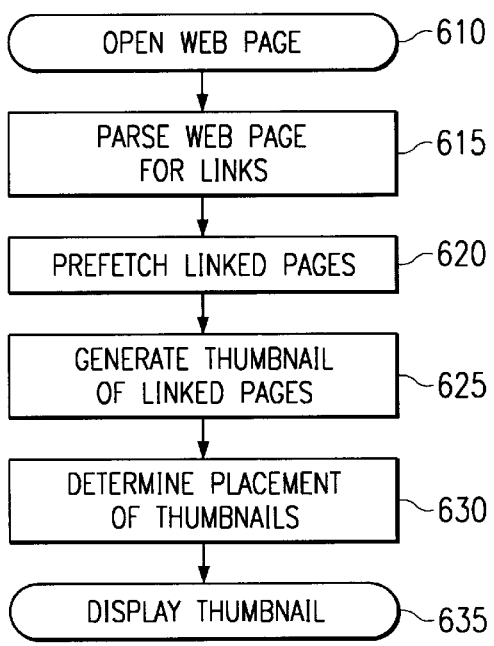
FIG. 6 shows a flowchart for an overview of a preferred embodiment of the present invention.

Turning now to FIG. 6, a flowchart illustrating an overview of a preferred embodiment of the present invention is shown. As a user opens a first web page (step 610) with web browser 500, thumbnail assistant 516 parses the web page for links to other web pages (step 615). Thumbnail assistant 516 then prefetches the web pages associated with the links found in the first web page (step 620). Thumbnail assistant 516 then generates thumbnail images for each linked web page (step 625) and determines the appropriate placement of the thumbnail images (step 630). These thumbnails are then displayed to the user (step 635).

Figure 7:
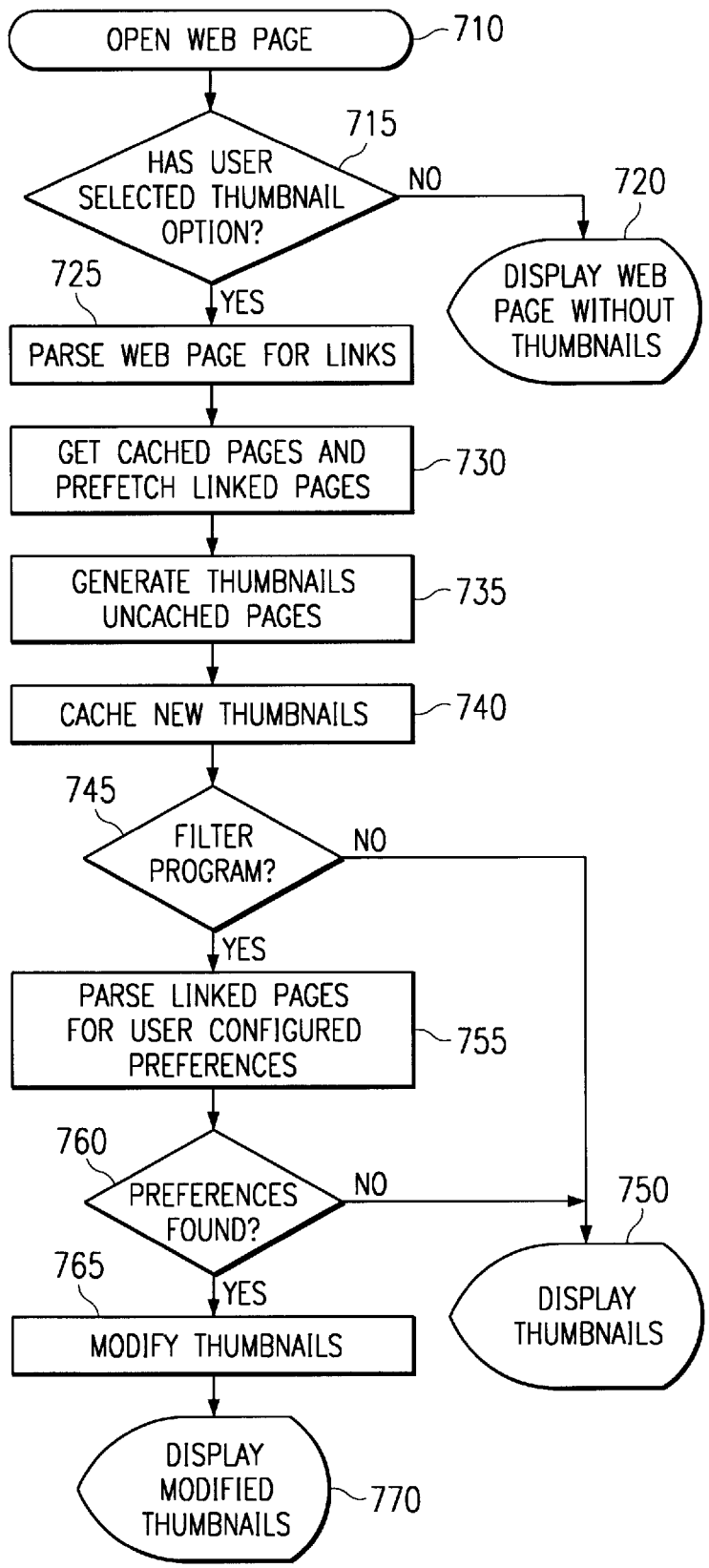
FIG. 7 shows a more detailed flow chart for a preferred embodiment of the present invention.

A more detailed understanding of a preferred embodiment of the present invention is disclosed with reference to the flowchart illustrated in FIG. 7. As web browser 500 opens a web page (step 710), thumbnail assistant 516 determines whether the user has selected the thumbnail option (step 715). If the thumbnail option has not been selected, then web browser 500 displays the web page without thumbnails in the customary fashion (step 720).

If the thumbnail option has been selected, then thumbnail assistant 516 parses the web page for links to other web pages (step 725). Thumbnail assistant 516 then checks the cache for linked pages and prefetches the linked pages that are not in the cache (step 730) using the prefetch mechanism associated with web browser 516. Thumbnail assistant 516 then generates thumbnails of each linked page that does not already have a thumbnail in the cache (step 735) and then stores the newly generated thumbnails in the cache (step 740).

Next, thumbnail assistant 516 determines whether a filtering program such as Net-Nanny or Digital Assistant is being used in conjunction with the thumbnail assistant (step 745). If no filtering program is being used, then thumbnail assistant displays, via the browsers display mechanism, the thumbnails to the user (step 750). In one preferred embodiment, the thumbnails are displayed in-line (that is each thumbnail is placed below the preceding thumbnail in a vertical line) near the corresponding link on the currently displayed web page as illustrated in FIG. 8.

Placement of thumbnails by the browser is largely dependent upon the configuration of the user. In some cases, such as with a legacy browser, placement may not be optional or, perhaps, the browser may not even be aware of the thumbnails. In a preferred embodiment of the present invention, thumbnails are automatically displayed in-line near the corresponding link on the currently displayed web page. Alternatively, the user might be queried for placement preferences, such as maximum distance from the link or preferred placement in terms of top, right, left, below, above, separate, etc.

Figure 8:
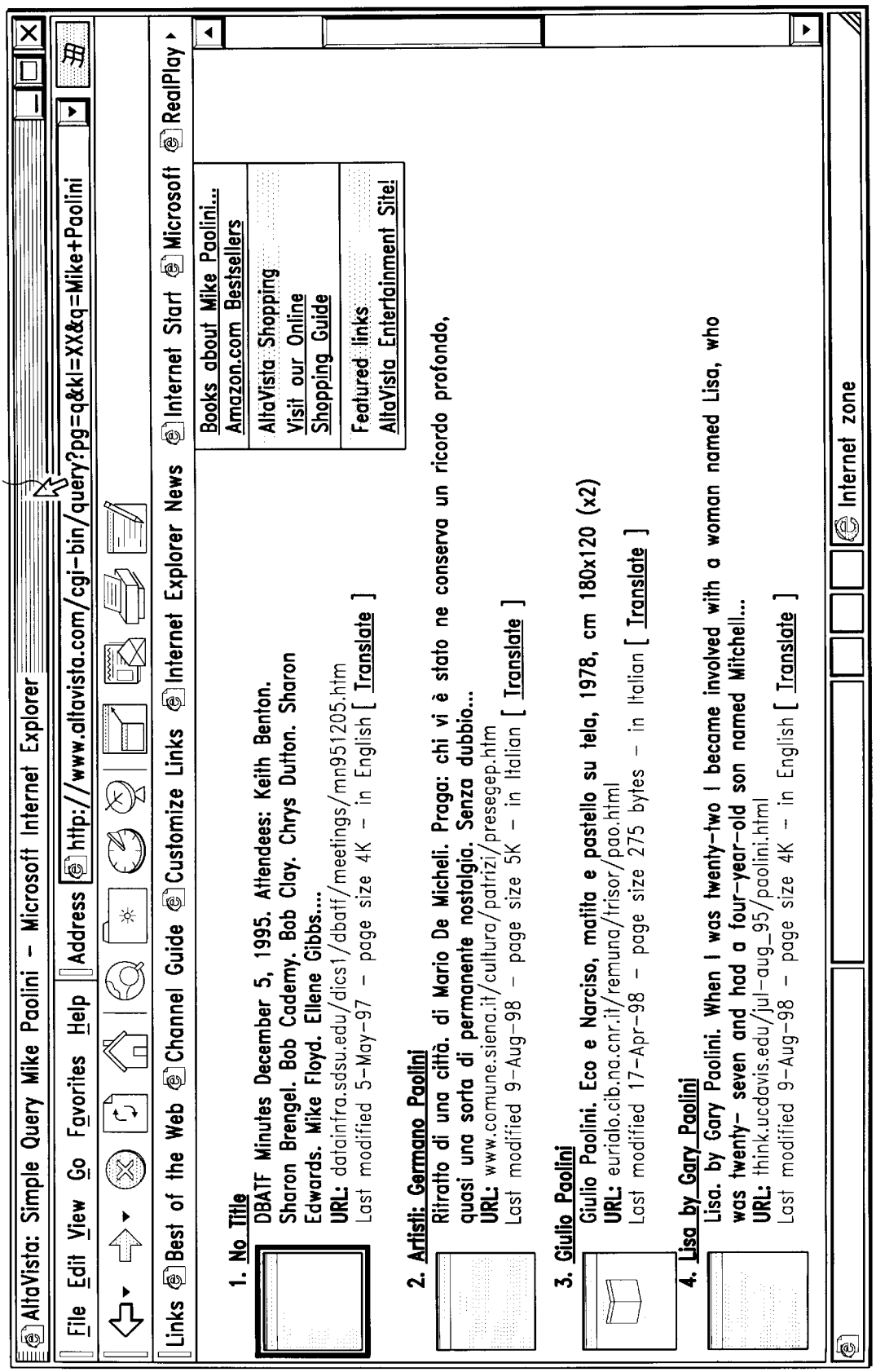
FIG. 8 shows a screen image for search results with thumbnails placed in-line near a respective link.

Also illustrated in FIG. 8 is a pointer 800 that allows a user to select various areas of a display. Pointer 800 may be manipulated, for example, by means of a mouse, a stylus pen, a joystick, or arrow keys. However, these are just a few methods of manipulating a pointer. Other examples are well known to those skilled in the art.

If a filtering program is being used, then thumbnail assistant 516 waits while the filtering program parses the prefetched linked page for user configured preferences (step 755). If user configured preferences are not found, then the thumbnails are displayed unmodified (step 750). However, if preferences are found, then the thumbnails corresponding to linked pages that match user configured preferences are modified in a user configured manner (step 765) and then the modified thumbnails are displayed to the user (step 770). Steps 745 through 770 are preferably performed while the thumbnails are being generated (step 735), but can be performed after the thumbnails have been generated (step 735) as well.

An example of using a filtering program in conjunction with the thumbnail generation is a user configuring a preference to flag any page containing the words "Shania Twain", "49er's", "Java Programming", etc. While the user was viewing one page, for example, the results of a search from a search engine, the thumbnails would be built and placed inline. While the thumbnails were being built, the filter program would scan the source of the thumbnails, discover the words, and change the image border around the thumbnails corresponding to linked pages that match the criteria.

Refresh of the search page once the thumbnails are built can be achieved several ways. The first way is to place the highlighting around the thumbnail image as it is being built. That is, make it part of the thumbnail image itself. In this way, the source can be delivered, parsed and rendered, with a location held open for the loading of the thumbnail as it becomes available. The second method is to update the source to draw the box before it is sent to the user. This would require that the links be parsed prior to sending the source page to the user. Better methods include causing a live update to the page. This might be achieved in several different ways, including triggering scripting, that is, sending the information to the client, and having the browser act on it by drawing the box itself, that is, forcing a reload of the page and, therefore, allowing one of the first two methods to occur.

Figure 9:
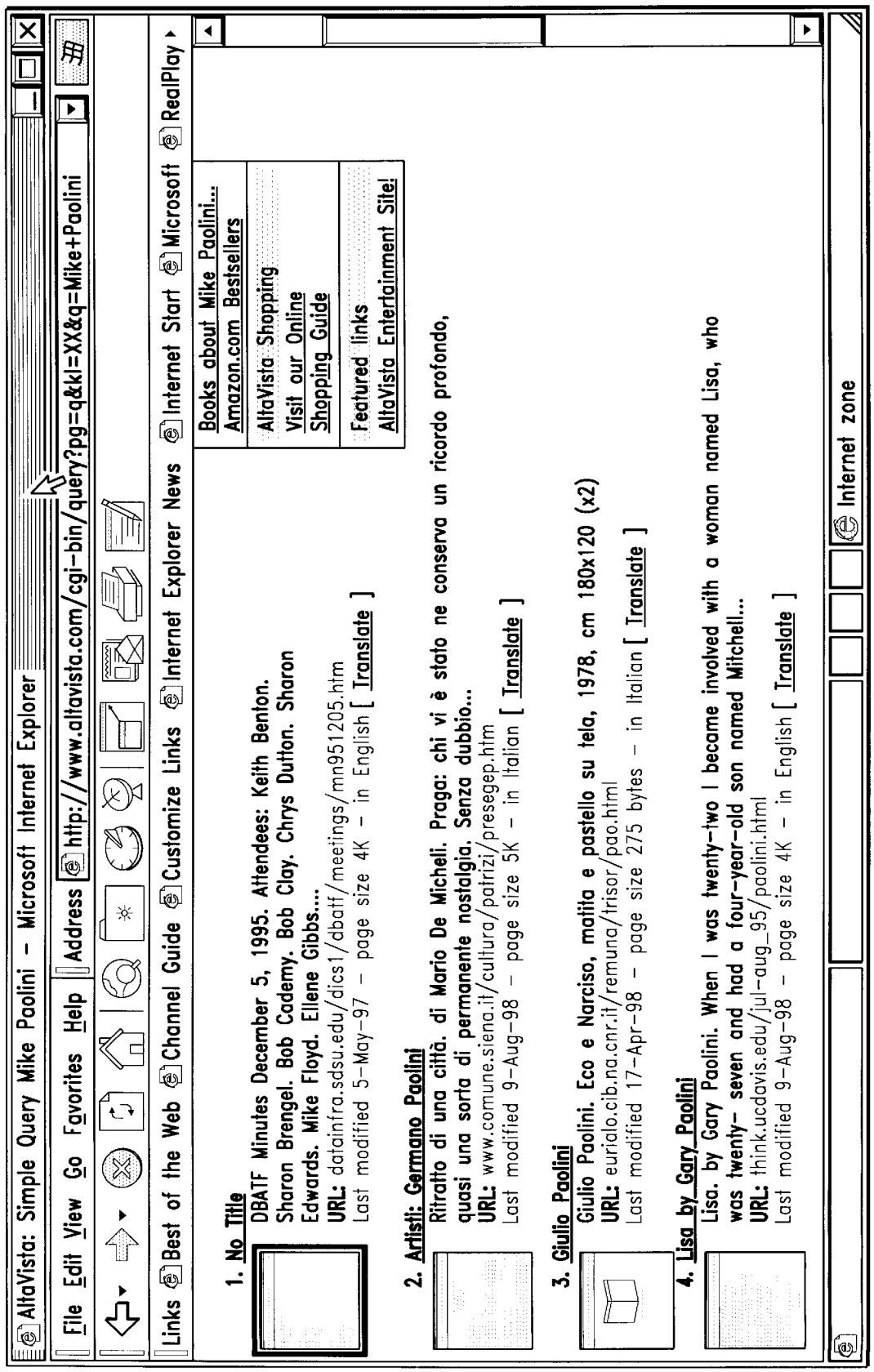
FIG. 9 shows a screen image for search results from a search engine with some thumbnails having a border.

An example illustrating this method of display is shown in FIG. 9 wherein links 1 and 4 have a border around their respective thumbnails. The thumbnail borders could be colored. For example, if the linked page contained some of the words, the thumbnail image border could be green, whereas, if more than a threshold of word(s) were encountered, the border could be changed to yellow or red. This could be achieved in several ways.

Figure 10:
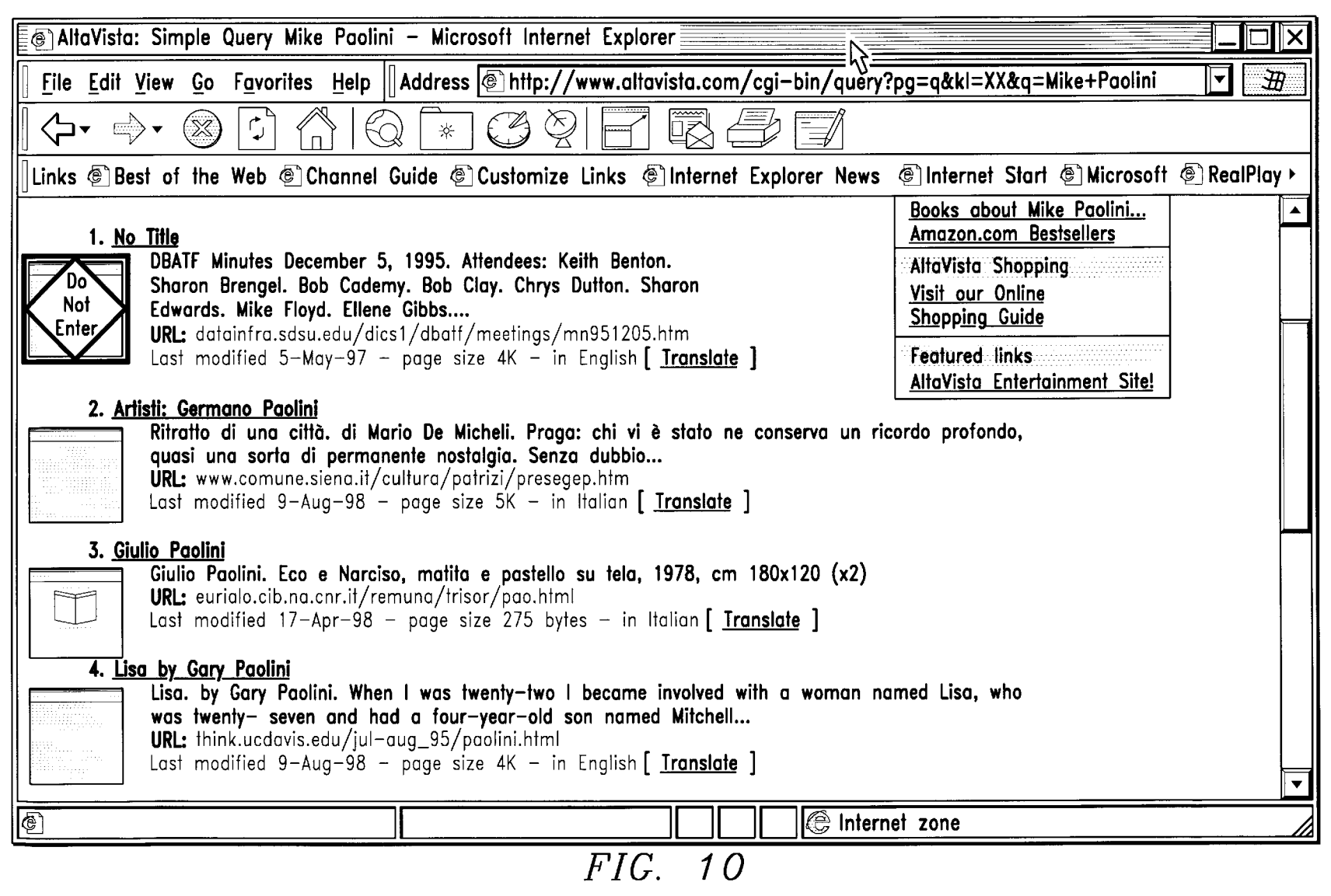

In another example illustrating the combination of filtering programs with thumbnail generation is shown in FIG. 10. In this example, the filtering program has detected undesirable content on the first linked page displayed in the search results. Thus, the thumbnail has been modified to have a diamond with "do not enter" written on it placed over the thumbnail image. These are but a few examples of modifications that can be made to the thumbnails and are not meant to be exhaustive. Other modifications to the thumbnail images, such as to indicate the presence of a dead link, will be obvious to those skilled in the art.

Figure 11:
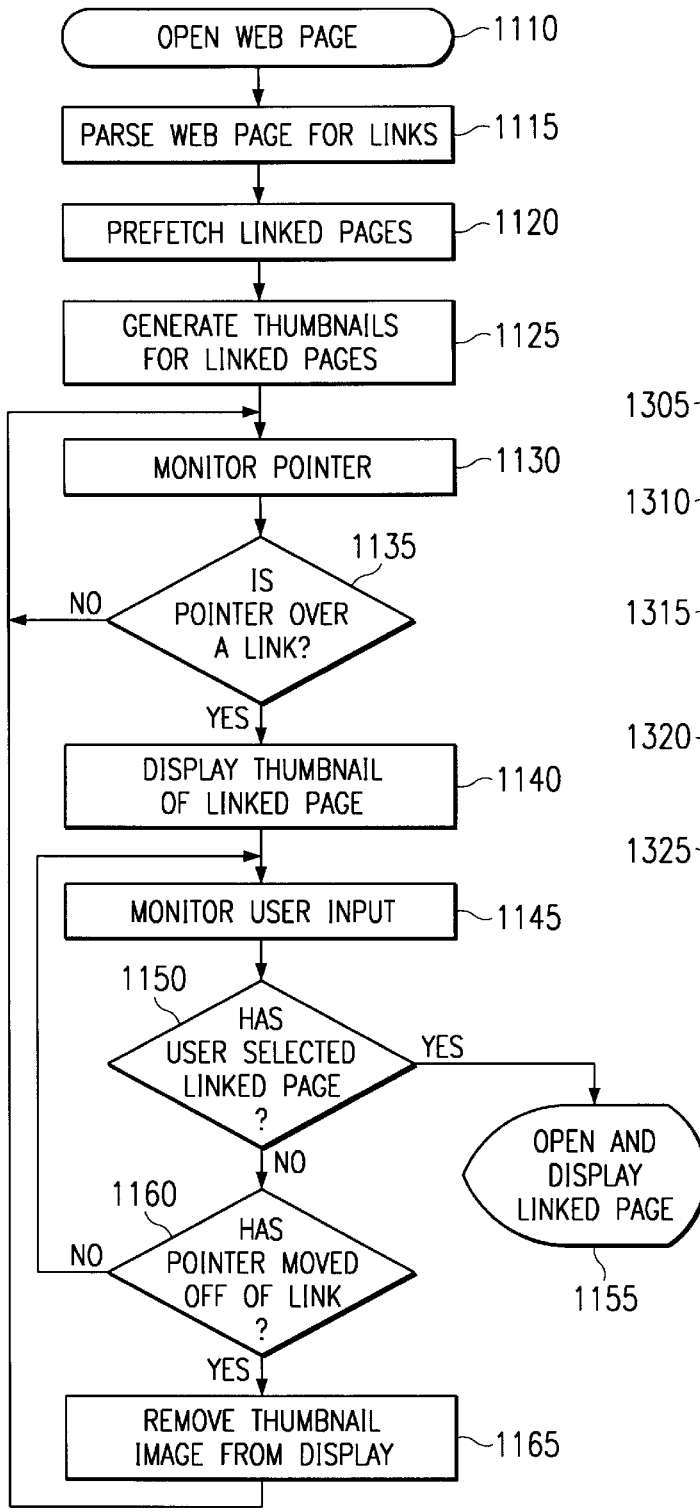
FIG. 11 shows a flowchart for a preferred embodiment of the present invention using pup-up thumbnails.

Turning now to FIG. 11, a flow chart depicting another preferred embodiment of the present invention using pop-up thumbnails is shown. As web browser 500 downloads a web page (step 1110), thumbnail assistant 516 parses the web page for links to other web pages (step 1115). The prefetch mechanism of web browser 500 then prefetches these linked web pages (step 1120). Thumbnail assistant 1125 then generates thumbnails for each of the linked pages and stores them in the cache (step 1125).

Thumbnail assistant 516 monitors the pointer location (step 1130) to determine if the pointer is located over a link on the currently viewed web page (step 1135). If the pointer is not over a link, then thumbnail assistant 516 continues to monitor the pointer (step 1130). However, if the pointer is over an active area associated with a link (step 1135), then thumbnail assistant 516 displays the thumbnail associated with that link. Preferably, the thumbnail is displayed near the link. An example of a pop-up is illustrated in FIG. 12 where the pointer is over link number 2 and a thumbnail image of that linked page is displayed near the pointer.

Thumbnail assistant 516 monitors user input (step 1145) to determine if the user has selected the linked web page whose thumbnail is currently displayed. If yes, then web browser 500 opens and displays the new page and then the process continues with the new page being parsed for links (step 1115) as before.

If the user has not selected the link (step 1150), thumbnail assistant 516 determines if the pointer has moved off of the area of the link (step 1160). If the pointer has not moved away from the active area, thumbnail assistant 516 continues to display the thumbnail and continues to monitor user input (step 1145). If the pointer has moved away from the active area (step 1160), then thumbnail assistant removes the thumbnail from the display (step 1165) and starts to monitor the pointer location (step 1130) again.

In another embodiment of the pop-up thumbnails, rather than generating and displaying thumbnails of the web pages associated with links, an icon representing the domain of that link could be generated and displayed next to the text representing the link. For example, if the domain is associated with Yahoo, then an icon displaying the Yahoo logo might be displayed next to the link. Furthermore, the icon could be assigned by the user or by the domain itself, and picked up automatically by the browser. This icon would then pop-up next to the link as the pointer moves over the link, just as the thumbnail does in the example depicted in FIG. 12.

Three methods might be implemented in order to produce these iconic representations of web page links. In the first case, this information could be embedded in the source. In the second instance, assuming the user recognizes the icon as a link, the user would then check the associated domain location, as opposed to a database (local or remote or both), and retrieve the icon. This would be the preferred method, given that the source would not have to be modified. Finally, the third alternative method for producing these icons is to send the information via a separate protocol/communication with the server.

In a further modification, the icon could be presented along with the thumbnail image of the associated linked page.

Figure 13:
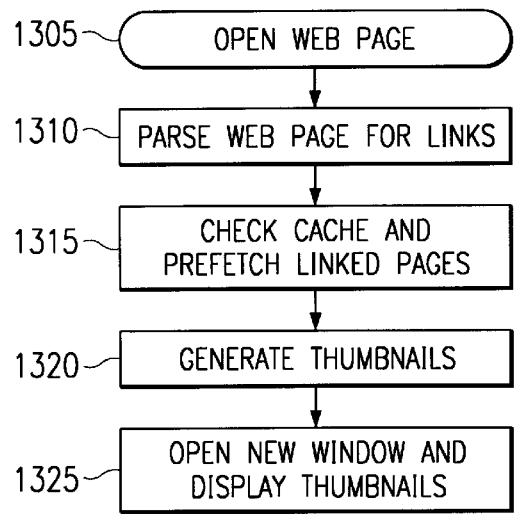
FIG. 13 shows a flowchart for a preferred embodiment of the present invention using a thumbnail palette.

Turning now to FIG. 13, a flow chart illustrating another preferred embodiment of the present invention is shown, in which the thumbnails are displayed in a separate frame window. As web browser 500 opens and loads a web page (step 1305), thumbnail assistant 516 parses the web page for links to other web pages (step 1310). Thumbnail assistant 516 then checks the cache to determine if any of the linked pages have been previously loaded, whether thumbnail images have already been generated, and then prefetches linked pages that have not been cached (step 1315). Thumbnail assistant 516 then generates thumbnails for each linked page for which a thumbnail has not previously been generated (step 1320). Next, a new frame window is opened, and a thumbnail for each page is displayed in a vertically scrollable list in the new frame window (step 1325).

Figure 14:
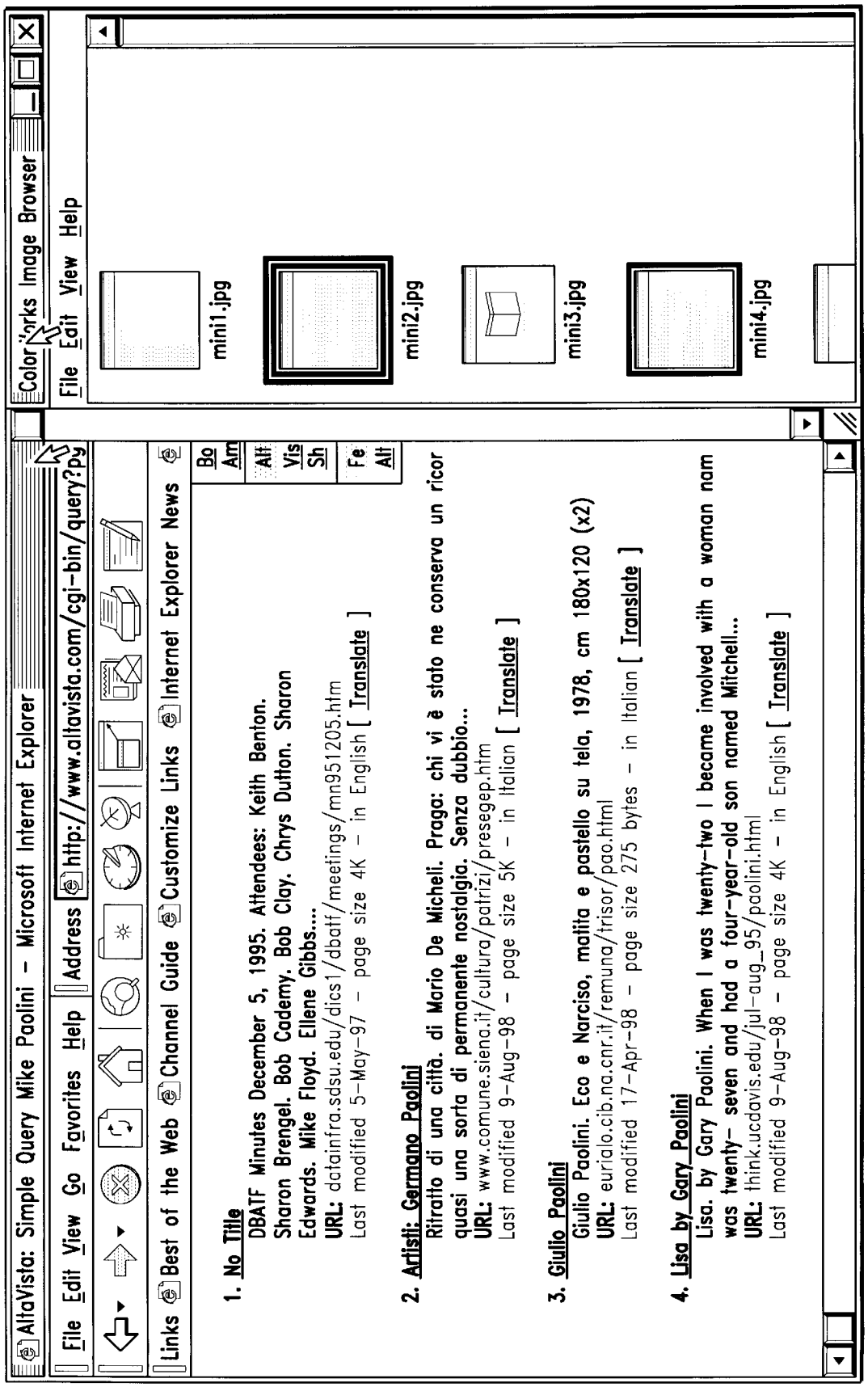
FIG. 14 shows a screen image of search results with thumbnails of links displayed in a separate window.

An example of a new, or second frame window with thumbnails arranged in a vertically scrollable list is illustrated in FIG. 14. FIG. 14 shows search results returned by a search engine, displayed in a two page view with search results on the left and thumbnails representing the first page of each linked page displayed in a vertically scrollable list on the right. Depending upon user configurations, one example of how this might work would be for the user to notify the secondary window of primary window mouse movements (i.e., to indicate which element/link the mouse is over) and to set secondary window preferences to match the link in the first window by automatically scrolling to the associated link in the secondary window. Further, the user might also select a setting to cause both the original link and the secondary link to be highlighted, forming a visual association between the two for the user.

Although described as presented to the user as a vertically scrollable list in a two page view, the thumbnails could be presented to the user in other manners. Some examples of other display options include, but are not limited to, a horizontally scrollable list in the same frame window, as a vertically scrollable list in the same frame window, arranged around the perimeter of the browser frame, in a dragable palette that can be torn off from the owning frame and then resized, and in a separate frame window. Other equivalent examples of displaying the thumbnails will be obvious to one skilled in the art.

As used to describe the present invention, the term thumbnail has been used to describe a small picture representing a visual summary of a bigger picture which is typically of a web page. Furthermore, the thumbnails can be of arbitrary size. Also, the thumbnails could be resizable. Methods of generating thumbnails are well known to those skilled in the art.

Although described in the context of and is particularly applicable to the Internet, the present invention is equally applicable to displaying linked documents on an Intranet, Local Area Networks ("LANs"), and Wide Area Networks ("WANs") as well.

The present invention has been described primarily with reference to a hyperlinked database. It should be noted, however, that the term "hyperlinked database" as used herein includes the Internet and the World Wide Web. However, other hyperlinked documents are known to the art.

It is important to note that a set of thumbnails, as described herein, may refer to one or to a plurality of thumbnails. It is also important to note that the thumbnail images may be resizable to allow a user to customize the display to taste.

Although the present invention has been described primarily with reference to HTML documents, the present invention applies to other document formats and markup languages as well. For example, such other markup languages include, but are not limited to, Extensible Markup Language (XML), Vector Markup Language (VML), Virtual Reality Markup Language (VRML), Dynamic Hypertext Markup Language (DHTML), and Extended Hypertext Markup Language (XHTML). An example of other document formats includes, but is not limited, to a Postscript Document Format (PDF).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for presenting content from a web page in a distributed database, comprising the steps of presenting a web page from the distributed database, wherein said web page includes a plurality of links to linked web pages in the distributed database, wherein the linked web pages are written in a markup language;

retrieving at least one of the linked web pages;

parsing the markup language of the at least one of the linked web pages;

creating a thumbnail image of the at least one of the linked web pages, wherein the thumbnail image represents how the at least one of the linked web pages would be displayed by a browser which parsed the markup language of the at least one of the linked web pages; and presenting the thumbnail image of the at least one of the linked web pages proximate to the web page so that a user may examine a thumbnail image to determine whether to navigate to a corresponding linked web page.

2. The method as recited in claim 1, wherein the thumbnail is presented in a separate panel.

3. The method as recited in claim 1, wherein the thumbnail image is presented proximate to a corresponding link.

4. The method as recited in claim 1, wherein the thumbnail corresponding to a link is presented when a pointer icon is moved proximate to the link.

5. The method as recited in claim 1, wherein thumbnail images of at least two linked web pages are presented and wherein the thumbnail images are presented in a list.

6. The method as recited in claim 5, wherein the list is a scrollable list.

7. The method as recited in claim 1, wherein the markup language is a hypertext markup language.

8. The method as recited in claim 1, wherein the markup language is an extensible markup language.

9. The method as recited in claim 1, wherein there are at least two thumbnails and wherein the thumbnails are arranged around the perimeter of the presentation of the web page.

10. The method as recited in claim 1, wherein there are at least two thumbnails, the web page is presented in a frame, and the thumbnails are arranged around the perimeter of the frame.

11. The method as recited in claim 1, wherein the thumbnail is presented in a dragable palette.

12. The method as recited in claim 11, wherein the pallet is resizable.

13. The method as recited in claim 1, wherein the thumbnail is resizable.

14. A computer program product in a computer readable media for use in a data processing system for presenting content from a web page in a distributed database, comprising:

first instructions for presenting a web page from the distributed database, wherein said web page includes a plurality of links to linked web pages in the distributed database, wherein the linked web pages are written in a markup language;

second instructions for retrieving at least one of the linked web pages;

third instructions for parsing the markup language of the at least one of the linked web pages;

fourth instructions for creating a thumbnail image of the at least one of the linked web pages, wherein the thumbnail image represents how the at least one of the linked web pages would be displayed by a browser which parsed the markup language of the at least one of the linked web pages; and fifth instructions for presenting the thumbnail image of the at least one of the linked web pages proximate to the web page so that a user may examine a thumbnail image to determine whether to navigate to a corresponding linked web page.

15. The computer program product as recited in claim 14, wherein there are at least two thumbnails and the thumbnails are presented in a separate panel from the web page.

16. The computer program product as recited in claim 14, wherein the thumbnail is presented proximate to a corresponding link.

17. The computer program product as recited in claim 14, wherein the thumbnail corresponding to a link is presented where a pointer icon is moved proximate to the corresponding link.

18. The computer program product as recited in claim 14, wherein the thumbnail is presented in a dragable palette.

19. The computer program product as recited in claim 18, wherein the palette is resizable.

20. The computer program product as recited in claim 14, wherein the thumbnail is resizable.

21. A system for presenting content from a web page in a distributed database, comprising:

first means for presenting a web page from the distributed database, wherein said web page includes a plurality of links to linked web pages in the distributed database, wherein the linked web pages are written in a markup language;

second means for retrieving at least one of the linked web pages;

third means for parsing the markup language of the at least one of the linked web pages;

fourth means for creating a thumbnail image of the at least one of the linked web pages, wherein the thumbnail image represents how the at least one of the linked web pages would be displayed by a browser which parsed the markup language of the at least one of the linked web pages; and fifth means for presenting the thumbnail image of the at least one of the linked web pages proximate to the web page so that a user may examine a thumbnail image to determine whether to navigate to a corresponding linked web page.

22. The system as recited in claim 21, wherein there are at least two thumbnails and the thumbnails are presented in a separate panel from the web page.

23. The system as recited in claim 21, wherein the thumbnail is presented proximate to a corresponding link.

24. The system as recited in claim 21, wherein the thumbnail corresponding to a link is presented where a pointer icon is moved proximate to the corresponding link.

25. The system as recited in claim 21, wherein the thumbnail is presented in a dragable palette.

26. The system as recited in claim 25, wherein the palette is resizable.

27. The system as recited in claim 21, wherein the thumbnail is resizable.

28. A computer network, comprising:

a network;

a server connected to the network for providing web pages; and client connected to the network; wherein the network provides communications between the client and the server;

the client receives a web page from the server;

the client presents the web page from the server, wherein said web page includes a plurality of links to linked web pages, wherein the linked web pages are written in a markup language;

the client retrieves at least one of the linked web pages;

the client parses the markup language of the at least one of the linked web pages;

the client creates a thumbnail image of the at least one of the linked web pages, wherein the thumbnail image represents how the at least one of the linked web pages would be displayed by a browser which parsed the markup language of the at least one of the linked web pages; and the client presents the thumbnail image of the at least one of the linked web pages proximate to the web page so that a user may examine a thumbnail image to determine whether to navigate to a corresponding linked web page.

29. The computer network as recited in claim 28, wherein the thumbnail is resizable.

30. The computer network as recited in claim 28, wherein the thumbnail corresponding to a link is presented where a pointer icon is moved proximate to the corresponding link.

* * * * *

UNITED STATES PATENT AND TRADEMARK OFFICE
CERTIFICATE OF CORRECTION

PATENT NO. : 6,356,908 B1
DATED : March 12, 2002
INVENTOR(S) : Brown et al.

It is certified that error appears in the above-identified patent and that said Letters Patent is hereby corrected as shown below:

Column 10,
Line 17, delete "creating" and insert -- generating --.
Line 22, delete "and" and insert
--      scanning the corresponding linked web page with a filtering program;
        responsive to the scan results matching specified criteria, automatically modifying the generated thumbnail image that represent the contents of the web page; and --

Column 11,
Line 5, after "for", delete "creating" and insert -- generating --.
Line 10, delete "and" and insert
--      fifth instructions for scanning the corresponding linked web page with a filtering program;
    sixth instructions, responsive to the scan results matching specified criteria, automatically modifying the generated thumbnail image that represent the contents of the web page; and --
Line 11, delete "fifth instructions" and insert -- seventh instructions --.
Line 43, after "for", delete "creating" and insert -- generating --.
Line 48, delete "and" and insert
--      fifth means for scanning the corresponding linked web page with a filtering program;
        sixth means, responsive to the scan results to the scan results matching specified criteria, automatically modifying the generated thumbnail image that represent the contents of the web page; and --
Line 49, delete "fifth means" and insert -- seventh means --.

UNITED STATES PATENT AND TRADEMARK OFFICE
CERTIFICATE OF CORRECTION

PATENT NO.    : 6,356,908 B1
DATED         : March 12, 2002
INVENTOR(S)   : Brown et al.

It is certified that error appears in the above-identified patent and that said Letters Patent is hereby corrected as shown below:

Column 12,
Line 33, after "client" delete "creates" and insert -- generates --.
Line 38, delete "and" and insert
--       wherein the links are scanned with a filtering program;
         responsive to the scanning results matching specified criteria, automatically modifying the generated thumbnail image that represent the contents of the web page; and --

Signed and Sealed this

Eighth Day of October, 2002

Attest:

JAMES E. ROGAN
Attesting Officer    Director of the United States Patent and Trademark Office